T. SLOPER.
PROCESS OF MANUFACTURING ENDLESS DRIVING BELTS.
APPLICATION FILED MAR. 11, 1918.

1,271,785.

Patented July 9, 1918.
2 SHEETS—SHEET 1.

Inventor.
Thomas Sloper
by Bakewell, Byrnes & Parmelee
Attys.

T. SLOPER.
PROCESS OF MANUFACTURING ENDLESS DRIVING BELTS.
APPLICATION FILED MAR. 11, 1918.
1,271,785.
Patented July 9, 1918.
2 SHEETS—SHEET 2.
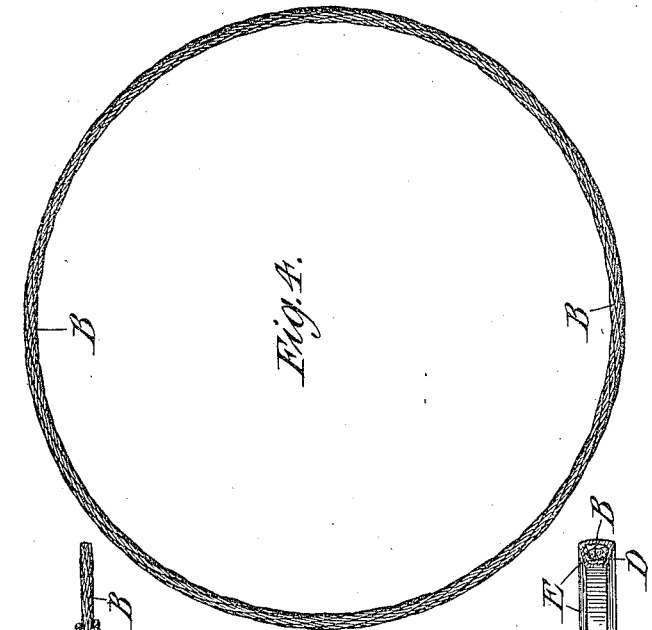
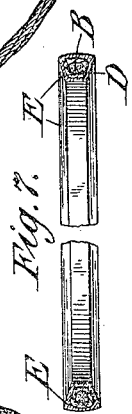
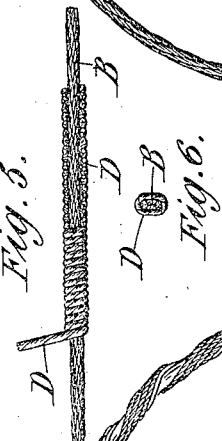
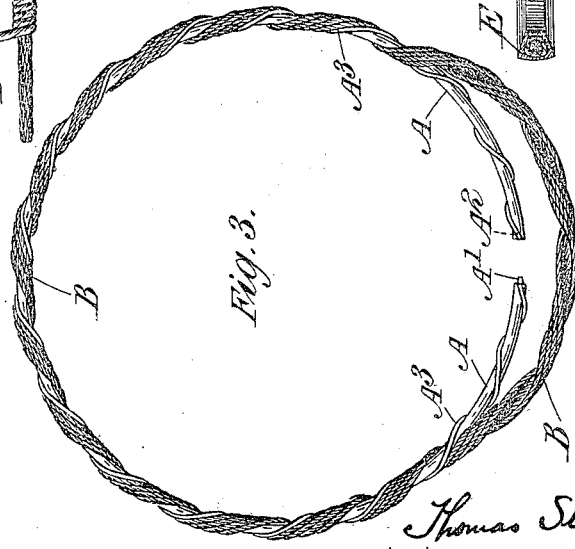

UNITED STATES PATENT OFFICE.

THOMAS SLOPER, OF DEVIZES, ENGLAND.

PROCESS OF MANUFACTURING ENDLESS DRIVING-BELTS.

1,271,785.

Specification of Letters Patent.

Patented July 9, 1918.

Application filed March 11, 1918. Serial No. 221,806.

*To all whom it may concern:*

Be it known that I, THOMAS SLOPER, a subject of the King of England, residing in Devizes, Wiltshire, England, have invented certain new and useful Improvements in Processes of Manufacturing Endless Driving-Belts, of which the following is a specification.

This invention is for improvements in the process of manufacturing endless driving-belts and has for its object to provide simple means whereby an endless cord core for a belt can be built up with a twist in it to prevent the separation of the strands which takes place when these are only laid side-by-side and the belt is used to run over a small pulley.

The process according to this invention consists in the following steps:—(a) winding a single strand of cord in an open spiral around an endless mandrel against a spiral gage which assists the operator in positioning the spirals of the cord on the mandrel and continuing this winding at least twice around the mandrel, the second or other windings lying preferably close against each other and the first winding, (b) joining the two ends of the cord after the predetermined number of windings has been completed, (c) removing the mandrel from the interior of the windings, and (d) stretching the belt thus formed so that the strands are all drawn together, with or without (e) surrounding the belt after it has been stretched with rubber with or without other reinforcing or covering material, and (f) vulcanizing the whole together.

Preferably the mandrel upon which the core is wound is jointed at one point, for example, it may be reduced at one end and made to enter a corresponding orifice at the other end, so that when the winding is to be released from the mandrel it is only necessary to separate the two ends, when the mandrel can be slipped out.

As a gage for determining the length of the belt and a guide to the winding of the cord, a spiral winding of wire is conveniently permanently secured around the mandrel and the first winding of the cord is then laid close against this fixed spiral of wire; thus the length of the cord for the first winding is determined and is guided while the length of the next turn is determined and guided by laying it against the first winding and so on.

In the accompanying drawings which illustrate one method of carrying out this invention:—

Fig. 3 illustrates the method of removing the mandrel from the endless driving-belt;

Fig. 4 shows a portion of the endless driving-belt in the form it assumes after it has been removed from the mandrel and stretched;

Fig. 5 shows the method of surrounding the belt with an outer winding of cord;

Fig. 6 is a section of the belt constructed according to Fig. 5 after it has been flattened, and Fig. 7 shows the same belt cased with rubber.

The same letters indicate the same parts throughout the drawings.

Figure 1:
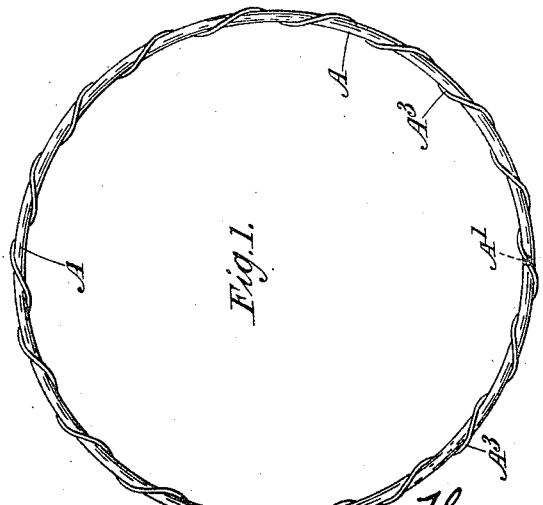
Figure 1 is an elevation of a portion of the mandrel upon which the endless driving-belt is built up.

The mandrel A, which may be of steel, is bent around to the form of a ring and one end is provided with a forwardly-projecting pin $A^1$, Fig. 3, which enters a corresponding socket $A^2$ in the opposite end, so that the ends can be made to meet, as shown in Fig. 1, and are prevented by the pin $A^1$ from lateral displacement when so engaged. Secured around the mandrel is a wire $A^3$ which is wound around it as a continuous spiral and may be soldered or otherwise secured thereto. The wire of course is divided at the point of juncture of the two ends of the mandrel, but the divided portions lie in line with each other as shown in Fig. 1.

Figure 2:
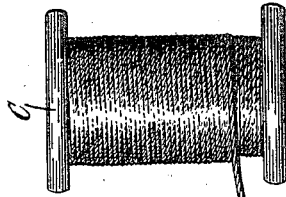
Fig. 2 shows the same portion of the mandrel with the endless driving-belt wound in position upon it.
Figure 2:
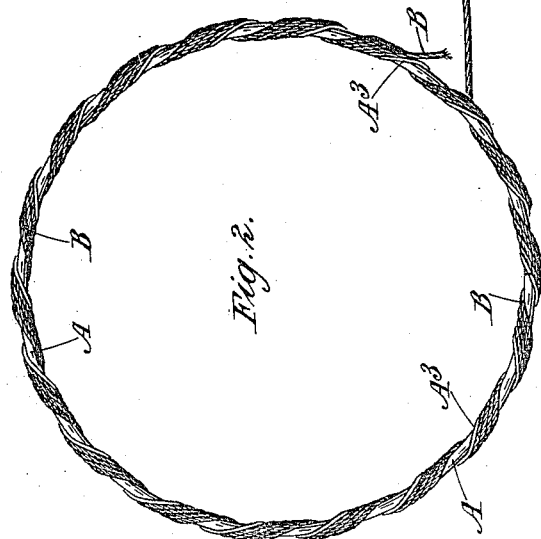

In building an endless driving-belt on this mandrel, the cord B may be carried by a bobbin C, and the first winding is laid beside the spiral $A^3$ so that the length of the cord in the first winding is determined and each turn of the spiral is positioned. The starting end is shown at the right of Fig. 2 and the winding is continued as many times around the mandrel as there are to be cords in the finished belt, the second winding being laid beside the one first laid, and the subsequent windings each beside the one last laid. When a sufficient number of cords, that is, turns of one continuous cord, have been thus laid side-by-side around the mandrel, the starting end and the finishing end, which constitute the only cord ends in the belt, are brought together and spliced in any desired manner.

The winding being now complete, the belt is removed by first pulling the ends of the mandrel apart, as shown in Fig. 3, and then untwisting the belt from the mandrel by revolving it around one of the separated ends. The belt when first removed is in the form of an open spiral, as indicated by the removed portion illustrated in Fig. 3, but when the whole belt is free it is stretched and the windings then come close together, as shown in Fig. 4.

The cord of which the belt is composed may be of any suitable material and the twisted belt thus produced may constitute the finished article, or the cords may be made to adhere together by any desired treatment, with or without the whole being provided with a covering. If the cords are rubbered similarly to the cords used for the well-known cord-tires, the belt may be vulcanized, and before doing so it may be wrapped around with a reinforcing winding of cord D, as shown in Fig. 5, and finally covered with rubber, as shown at E in Fig. 7, and the whole vulcanized together. When the cord is to be covered with the rubber E, it is found difficult to get into the usual plunger-mold if the cord-portion is circular, and to make it easier to handle in these well-known molds, it is preferably passed between rolls before being covered with the rubber E so that it is brought to the cross-section indicated in Fig. 6. When so shaped, it, after being surrounded with rubber, can be easily dropped into the plunger-mold in which it is vulcanized, and the pressure of the mold then brings it to the well-known V-section indicated in Fig. 7.

It will be appreciated that without the use of any rubber or other covering, or any impregnating material, the driving-belt constructed in the form shown in Fig. 4 is neat and suitable for various purposes.

The advantages of my invention result from the provision of a method of making endless driving belts from a single strand wound in a plurality of spirals, whereby the length of the cord to each spiral, as well as the position thereof, is determined, so that all of the belts made on the same mandrel and with the same number of coils will be of the same length.

The belt may be surrounded with a layer of rubber or rubber solution prior to applying the winding D.

Obviously the reinforcing winding D may be omitted if desired and the rubber covering E brought into direct contact with the cords B.

I am aware of the United States patent to Hubbard, No. 626,998, and do not claim the method of winding shown therein. In winding, according to Hubbard's method, the relative speeds of travel of the mandrel and of the rotation of the shuttle are automatically controlled by the machine, and a spiral gage such as I provide would be superfluous. In winding my belt, the cord is wound on the mandrel A by hand, or by manually controlled mechanism in such a manner that the positioning of the windings is always subject to the control of the operator, as contrasted with the automatic machine control of the Hubbard patent. In my method, the positioning of the first winding on the mandrel is accomplished by the operator winding the cord against the spiral gage $A^3$. This spiral gage obviates the possible errors in winding by the operator and insures that each belt is wound with the same number of spirals and of spirals of uniform pitch. This insures that when the belts are stretched to final form, they are of uniform composition and length.

What I claim as my invention and desire to secure by Letters Patent is:—

The method of manufacturing endless driving belts, comprising the steps of providing a mandrel in the form of a split ring, then winding with a spiral gage thereon, then winding a single strand of cord in an open spiral around the mandrel and against the spiral gage to determine the length of the cord of the first winding and the position of each turn of the winding with relation to the other turns, and continuing this winding at least twice around the mandrel, the second or subsequent windings lying preferably close against the next preceding winding, then joining the ends of the cord after the number of windings have been completed, then removing the mandrel from the interior of the windings, and then stretching the belt to draw the first and last of the windings against each other, substantially as described.

In testimony whereof I affix my signature.

THOMAS SLOPER.